2 Sheets—Sheet 1.
S. B. WARD.
PLOW.
No. 176,717.    Patented April 25, 1876.
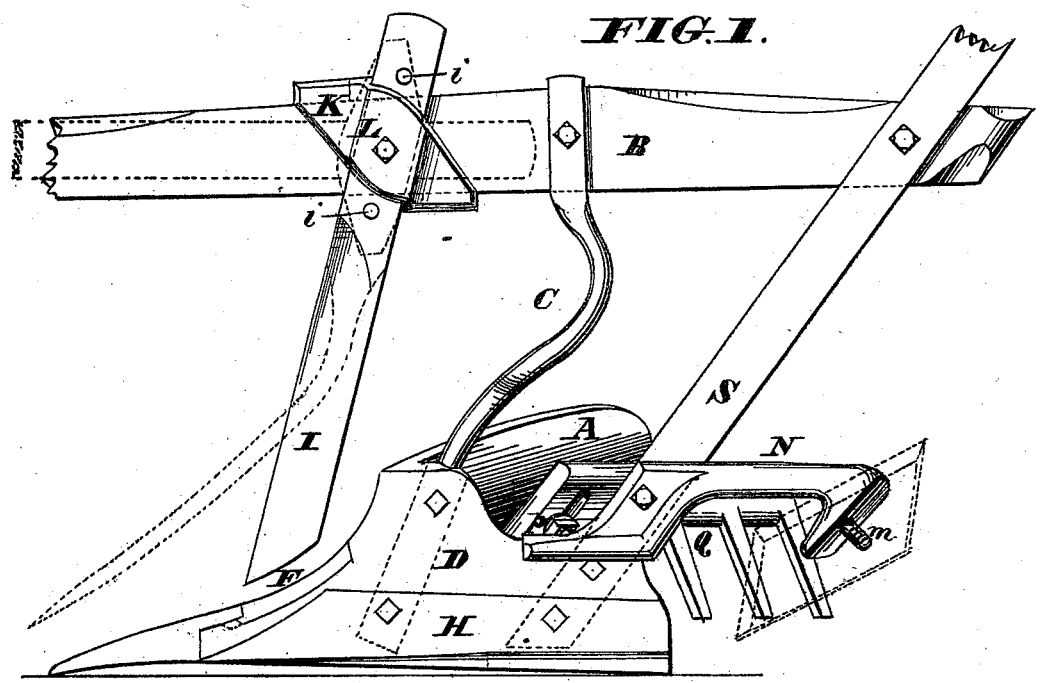
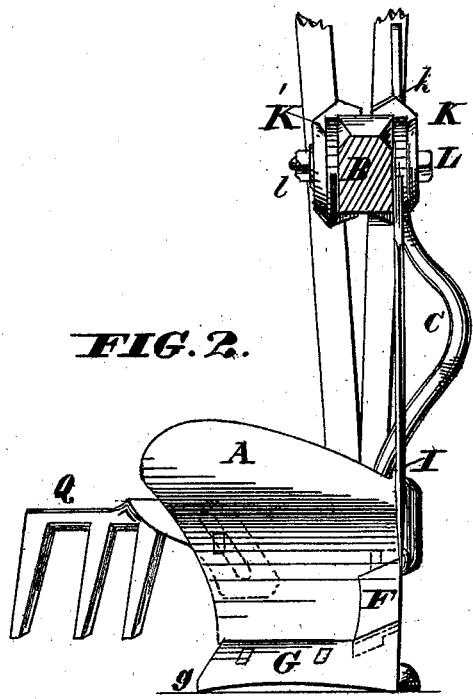
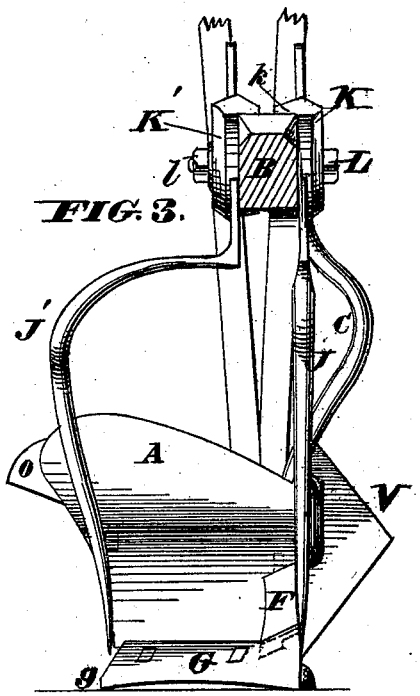
WITNESSES
INVENTOR
Saml. B. Ward
By Knight Bros. Attorneys.
N. PETERS, PHOTO-LITHOGRAPHER, WASHINGTON, D.C.

2 Sheets—Sheet 2.
S. B. WARD.
PLOW.
No. 176,717. Patented April 25, 1876.
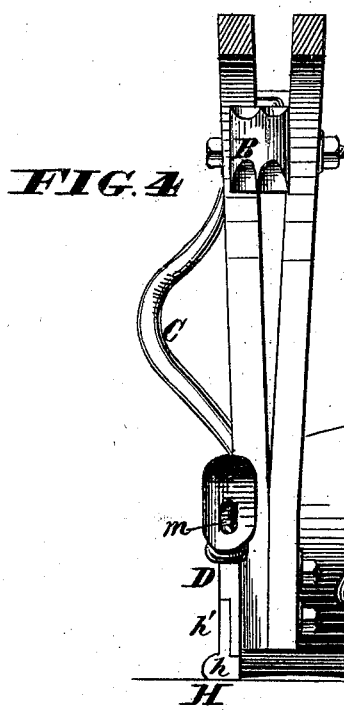
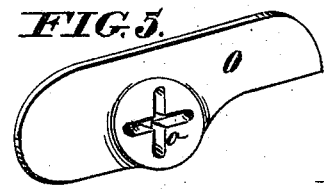
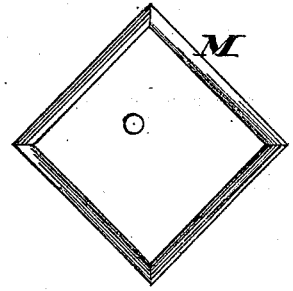
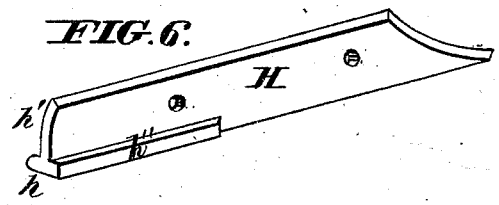
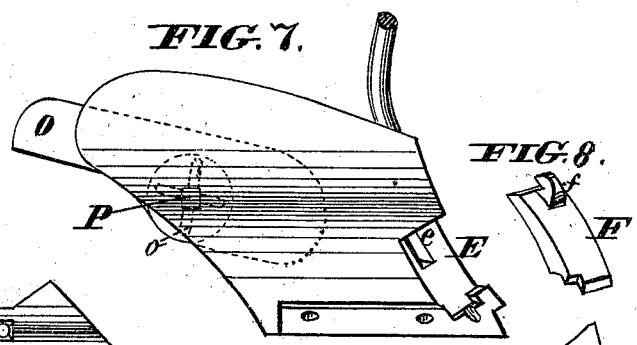
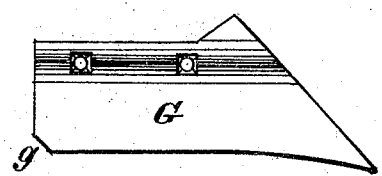
WITNESSES
LeBlond, Burdett
Alex H Gall
INVENTOR
Saml. B. Ward
By Knight Bros Attorneys
N. PETERS, PHOTO-LITHOGRAPHER, WASHINGTON, D. C.

UNITED STATES PATENT OFFICE.

SAMUEL B. WARD, OF LOCUST MOUNT, VIRGINIA.

IMPROVEMENT IN PLOWS.

Specification forming part of Letters Patent No. 176,717, dated April 25, 1876; application filed October 12, 1875.

*To all whom it may concern:*

Be it known that I, SAMUEL B. WARD, of Locust Mount, in the county of Accomack and State of Virginia, have invented certain new and useful Improvements in Plows, of which the following is a specification:

The subject-matter of my invention is a convertible plow, with attachments adapted for use for breaking up ground of different descriptions, covering and exterminating weeds, and cultivating various kinds of growing crops.

The improvements consist, first, in constructing a plow-standard round in its cross-section, and deflected or bowed over and beyond the land-side, so that it will offer no obstruction to the free passage of weeds and trash as they are discharged from the mold-board; second, in providing the front cutting-edge of the mold-board with a removable wearing-section or face-plate, having a lug of peculiar construction adapted to fit an aperture or socket in a recessed portion of the mold-board; third, in deflecting fingers arranged on either side of the beam for gathering growing vines out of the way of the plow; fourth, in the application to the rear of the land-side of an adjustable eccentric steel hoe, adapted to be set at a greater or less elevation; fifth, in the application to the rear of the mold-board of an adjustable extension-plate, provided with intersecting slots for various adjustments.

In the accompanying drawings, Figure 1 is a side elevation of the working parts of a plow illustrating the invention. Fig. 2 is a front elevation of the same, showing the cutting-knife and the mold-board rake in position. Fig. 3 is a front elevation, showing the deflecting fingers and the adjustable mold-board extension-plate in position. Fig. 4 is a rear elevation. Fig. 5 is a perspective view of the mold-board extension-piece detached. Fig. 6 is a perspective view of the land-side shoe detached. Fig. 7 is a side elevation of the mold-board, with the share or point and the removable face-plate omitted. Fig. 8 is a perspective view of the under side of the removable face-plate. Fig. 9 is a perspective view of the under side of the share or point. Fig. 10 is a plan of the working-face of the share. Fig. 11 is a view of the eccentric hoe detached.

The mold-board A, in its general construction, may be of common form. The land-side D is connected to the beam B by the standard C, preferably of wrought-iron, which is round in its transverse section, and is bowed over beyond the land-side, so as to afford a free passage for the escape of weeds and other light matter which may rise above the mold-board. On the front cutting-edge of the mold-board A is formed a cavity, E, Fig. 7, for the reception of a removable face-plate, F, which is shown in position in Figs. 1, 2, and 3, and detached in Fig. 8. This face-plate occupies and constitutes so much of the cutting-edge of the mold-board as runs at or near the surface of the ground, and sustains the principal wear and violence in use. It is fastened in position by means of a lug, $f$, projecting from its under side and upper end, and engaging in the aperture or socket $e$, Fig. 7, and by the point or share G, which is fitted to the lower edge of the mold-board in customary manner, and engages over the lower end of the face-plate F, which it is formed to fit, as illustrated in Fig. 8, and in Figs. 1, 2, and 3. To this end the said share is constructed with its upper front corner $g'$ inclined upward and backward, to fit the lower end of the working-face of the plate F, which face is rectangular, or nearly so. At the rear of the lower front corner of the share is a projection, $g''$, which forms the point of the mold-board.

The lower rear corner of the share G is beveled, as shown at $g$, giving to the said corner an edge parallel, or nearly so, with the land-side of the plow, so that as the share wears away it will still continue to cut a furrow of uniform width. The land-side is constructed with a removable shoe, H, which is shown in position in Figs. 1 and 4, and detached in Fig. 6. This shoe is constructed with a broad base, $h$, which occupies and constitutes the bottom of the land-side at its rear part, where the principal wear and violence are sustained. The bead formed by the base $h$ gradually tapers upward toward the point, and the flange $h''$ on the opposite side forms a substantial connection for the attachment of the shoe to the bottom of the land-side. The upper part of the shoe consists of a vertical flange, $h'$, which is bolted to the land-side D, the latter being properly recessed to receive it.

The parts F, G, and H constitute separate castings, which, being supplied to the farmer as required at a small cost, enable him to keep his plow in perfect working order without any considerable expenditure of time or money.

A leading object of my invention is to provide the farmer with a single implement adapted for the various purposes of breaking and turning sods of various kinds, and, when desired, completely covering the vegetation thereon; also, for cultivating growing crops of various descriptions without injury thereto. To this end I provide the plow with sundry attachments, some of them interchangeable, but all forming parts of one implement, and adapted for optional use, as hereinafter described.

In Figs. 1 and 2, I represents a knife or colter depending from the beam, and firmly fixed thereto by the clamp-plate K, and horizontal bolt L fixed by a nut, $l$. The clamp-plate K is formed at its ends with lugs $k$, projecting horizontally, and bearing against the upper and under surfaces of the beam, so as to brace the cutter I firmly in position. The shank of the said cutter bears against the sides of a suitable seat or recess formed to receive it in the inner face of the clamp-plate. The shank of the cutter I is provided with a number of apertures, $i$, through either of which the bolt L may be passed so as to fix the cutter at any desired height. The cutter I is set in line with the guiding-edge of the mold-board, and serves to sever any vines or other vegetation which are to be turned under by the plow, and, if desired, may be set so low as to serve as a colter. When not in use the knife I is fixed horizontally alongside the beam by the same clamp, as shown in dotted lines. J J' are a pair of fingers fixed to the sides of the beam by means of the clamp-plate K on one side, and a similar clamp-plate K' on the other, the bolt L passing through both, and being secured by the nut $l$, as before.

The fingers J J', the latter being bowed, as represented in Fig. 3, are fixed about in line with the two lateral extremities of the mold-board, and are for the purpose of raising from the surface of the ground and deflecting to either side of the path of the plow such vines as it may be desirable to protect from injury, while cultivating growing crops. This device is especially valuable in the cultivation of sweet potatoes, the vines of which spread over the ground between the rows, and are liable to injury in cultivation unless removed. By providing two round teeth or fingers, as shown, at a sufficient distance apart, the vines are gathered up without violence or injury and laid along the rows on either side of the furrow.

M represents an adjustable steel hoe fixed by an eccentric-pivot, $m$, to the extremity of the horizontal bar N, which is bolted to the plow-stock S, and fitted to the upper edge of the land-side B, in order that it may be braced vertically and laterally. The stock S may be formed of the lower ends of plow-handles of common construction, which are united at the bottom and bolted to the land-side D. The hoe M serves for various useful purposes, being employed, for example, to cover seed which may be dropped by any customary contrivance during the operation of plowing. The said hoe being fixed adjustably to the bar N by means of its eccentric-pivot $m$, can be set angle down or in horizontal position, as preferred, having eight different adjustments as to the height of its working edge or corner, as the case may be, above the sole of the plow.

The effective length of the mold-board is extended, when required, by means of an adjustable plate, O, formed with intersecting slots $o$, through which is passed the bolt P for fixing the plate adjustably to the mold-board A. The extension-plate O is shown detached in Fig. 5, and in position in Fig. 7. By means of the cross-slots $o$, it may be set at any desired height or angle, or with any necessary longitudinal projection. It serves to elongate the mold-board, and thus to increase its turning capacity, as may be necessary.

By the same bolt P and nut $p$, is fixed to the mold-board a rake, Q, shown in Figs. 1, 2, and 4. The bolt passes through a vertical slot in the shank $q$ of this rake, adapting it to be set at any desired height. The rake Q serves a useful purpose in leveling and mellowing the freshly-turned earth after the manner of a harrow, with this difference, that the constant working of the rake on the fresh soil the instant that it is turned over results in the soil being worked into a friable condition in a very effective manner with but a small expenditure of power.

What I claim as new, and desire to secure by Letters Patent, is—

1. The standard C, flattened at each end and attached to the land-side and beam in or near the same vertical plane, having a middle portion, round in its cross-section, laterally and rearwardly inclined, and bowed over the land-side, as and for the purpose set forth.

2. The removable face-plate or wearing-section F, provided with lug $f$, in combination with recessed mold-board A, having an aperture or socket, $e$, as and for the purpose set forth.

3. The deflecting-fingers J J', clamps K K', and bolt L, in combination with the beam B, as and for the purpose set forth.

4. The adjustable eccentric steel hoe M, adapted to be set at a greater or less elevation, and attached rigidly to the stock S by bar N, said bar fitting over the land-side D, as and for the purpose set forth.

5. The adjustable extension-plate O, provided with intersecting slots $o$, for various adjustments, in combination with the mold-board A, as and for the purpose set forth.

SAMUEL B. WARD.

Witnesses:
ROBT. T. HARMON,
JAMES K. HARMON.